United States Patent
Zaydman et al.

(10) Patent No.: US 8,688,585 B2
(45) Date of Patent: Apr. 1, 2014

(54) REMOTE CONTAINER

(75) Inventors: Oleg Zaydman, San Jose, CA (US);
Clay Maeckel, San Jose, CA (US);
Lyndley Crumly, Frazier Park, CA (US)

(73) Assignee: Apple Inc., Cupertino, CA (US)

( * ) Notice: Subject to any disclaimer, the term of this patent is extended or adjusted under 35 U.S.C. 154(b) by 469 days.

(21) Appl. No.: 12/856,497

(22) Filed: Aug. 13, 2010

(65) Prior Publication Data

US 2012/0042174 A1  Feb. 16, 2012

(51) Int. Cl.
*G06F 21/00* (2013.01)
*H04K 3/00* (2006.01)

(52) U.S. Cl.
USPC .................................. 705/52; 360/201

(58) Field of Classification Search
USPC ............................................ 707/609
See application file for complete search history.

(56) References Cited

U.S. PATENT DOCUMENTS

| | | | |
|---|---|---|---|
| 5,349,541 A * | 9/1994 | Alexandro et al. ............. | 703/18 |
| 5,745,896 A | 4/1998 | Vijaykumar | |
| 5,857,207 A * | 1/1999 | Lo et al. ................................ | 1/1 |
| 5,907,704 A * | 5/1999 | Gudmundson et al. ....... | 717/100 |
| 6,138,119 A * | 10/2000 | Hall et al. .............................. | 1/1 |
| 6,449,367 B2 * | 9/2002 | Van Wie et al. ................ | 380/232 |
| 6,690,819 B1 * | 2/2004 | Teraji ............................. | 382/147 |
| 7,047,241 B1 * | 5/2006 | Erickson ................................ | 1/1 |
| 7,076,652 B2 * | 7/2006 | Ginter et al. ................... | 713/153 |
| 7,113,964 B1 | 9/2006 | Bequet et al. | |
| 7,155,676 B2 * | 12/2006 | Land et al. ..................... | 715/731 |
| 7,617,211 B2 | 11/2009 | Kres | |
| 7,685,092 B2 * | 3/2010 | Reichert et al. ......... | 707/999.001 |
| 7,734,663 B2 * | 6/2010 | DeAnna et al. ............... | 707/803 |
| 2004/0255301 A1 * | 12/2004 | Turski et al. ................... | 719/316 |
| 2005/0050116 A1 | 3/2005 | Gross et al. | |

* cited by examiner

*Primary Examiner* — Evans J Augustin
(74) *Attorney, Agent, or Firm* — Fish & Richardson P.C.

(57) ABSTRACT

Methods, program products, and systems implementing remote container techniques are disclosed. A relational database can include a container data field, which can be a data field for storing multimedia data. In one aspect, when the multimedia data are inserted into the container field, the multimedia data can be stored in one or more remote database files. The remote database files can be located separately from other data of the relational database and remotely from a client computer accessing the relational database. Corresponding data structures, or remote containers, can be configured to store metadata of the database files. References to the remote containers can be stored as values of the container data field. Using various encryption techniques, the remote database files can be given same access restrictions as access restrictions of the container data field, even when the remote database files are stored as flat files.

29 Claims, 14 Drawing Sheets ered in the column. A row of a table
REMOTE CONTAINER

TECHNICAL FIELD

This disclosure relates generally to database architecture.

BACKGROUND

A relational database can include a collection of relations, frequently known as tables. A table in the relational database can include a set of data elements or values that are organized using vertical columns and horizontal rows. The table can have a specified number of columns and a variable number of rows. Each column can have a data type that defines what category of data can be stored in the column. A row of a table can include one or more data fields. Each data field can correspond to a column, and have a data type that corresponds to the data type of the column. The type of a data column can be defined by a database schema, which can be a data model that defines how data in the relational database are represented or accessed. In a modern relational database, a data field can have a data type that permits storage of data having a large size compared to size of data of other data fields. For example, multimedia data (e.g., movie clips) can be stored in a relational database.

Data in relational databases can be stored as one or more database files on a file system. In conventional implementations of relational databases, the data having a large size, including multimedia data, can be stored together with other data fields in a same database file. A minor change in one of the other data fields can cause the entire database file to be marked as changed or "dirty" for backup purposes. A database backup program, even when configured to back up the relational database incrementally (e.g., only to back up changes since last backup), can be forced to back up a large amount of data, including the multimedia data, that did not actually change but were stored in a file that was marked as "dirty."

SUMMARY

Methods, program products, and systems implementing remote container techniques are disclosed. A relational database can include a container data field, which can be a data field for storing multimedia data. In one aspect, when the multimedia data are inserted into the container field, the multimedia data can be stored in one or more remote database files. The remote database files can be located separately from other data of the relational database and remotely from a client computer accessing the relational database. Corresponding data structures, or remote containers, can be configured to store metadata of the database files. References to the remote containers can be stored as values of the container data field. Using various encryption techniques, the remote database files can be given the same access restrictions as access restrictions of the container data field, even when the remote database files are stored as flat files.

In some implementations, a method implementing a remote container can include receiving data to be inserted into a container data field of a relational database; storing the data in a database file at a location specified for the container data field, the database file being external to other database files storing data of other data fields of the relational database; storing a reference to the database file in a first portion of a remote container; and associating the remote container with the container data field. The container data field can be configured to store content of at least one of a data stream, a binary object, or a file. The remote container can include a data structure configured to store information, including access restrictions information, of the database file. Associating the remote container with the container data field can include storing a reference to the remote container in the container data field.

These and other implementations can be utilized to achieve one or more of the following advantages. Remote container techniques can make incremental backup more efficient. Large database files (e.g., those contain multimedia data) can be referenced by remote containers and stored separately from other data. Small changes in the other data need not cause the large database files to be marked as dirty and backed up in an incremental backup.

Remote container techniques can make it possible to manage a database file, even when stored as flat file, using access restrictions specified for a data field in a relational database. A user can access content of a database file if the user's access privileges of the database file satisfy the access restrictions of the container field. For example, when user A shares content of a multimedia file with user B using a remote container, user B need not have access privilege to the multimedia file itself. User A can insert content of the multimedia file into a container data field in a relational database. The inserted content can be stored in a database file, the access to which can be restricted by the access restrictions of the container data field. User B can access the content according to user B's access privileges to the container data field as defined in the relational database.

The details of one or more implementations of remote container techniques are set forth in the accompanying drawings and the description below. Other features, aspects, and advantages of remote container will become apparent from the description, the drawings, and the claims

BRIEF DESCRIPTION OF THE DRAWINGS

Like reference symbols in the various drawings indicate like elements.

DETAILED DESCRIPTION

Remote Container Overview

Figure 1:
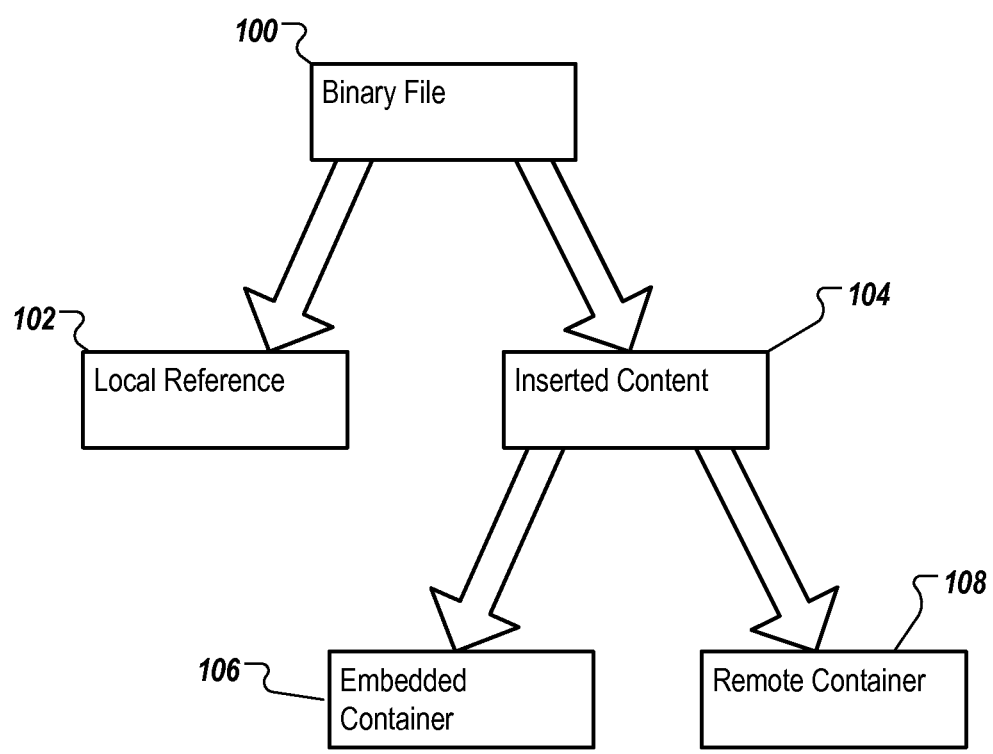
FIG. 1 illustrates techniques of implementing a container data field in a relational database.

FIG. 1 illustrates techniques of implementing a container data field in a relational database. For convenience, the techniques will be described in reference to a system implementing the relational database. The system can include one or more server computers hosting the relational database and one or more client computers through which solution developers (e.g., user who build and configure the relational database) and end users (e.g., users who use the relational database) can access the server computers.

A container data field can be a data field having a container data type as defined in a schema of the relational database. The container data field can store content of one or more of a data streams, binary objects, or a file. Some exemplary content that can be stored using a container data field can include image content, video content, audio content, portable document format (PDF) files, object linking and embedding (OLE) objects, or files of any type. In FIG. 1, binary file 100, stored on a client computer, is used to illustrate the implementation of a container data field in a relational database. Content of binary file 100 is to be inserted into a container data field of a relational database.

In various implementations, to insert the content of binary file 100 into the container data field, the system can store local reference 102 or store inserted content 104. The system can provide a choice of whether to store content of binary file 100 as local reference 102 or as inserted content 104. The choice can be presented to the user in an insertion selection user interface. If the system receives an end user choice to store the content of binary file 100 as local reference 102, the system need not load the content of binary file 100 to a server from the client storing binary file 100. The system can store a reference as a value of the container data field. The reference can be a path to binary file 100 as stored on the client computer. Access to content of binary file 100 can be limited to users who are privileged to access the client computer.

If the system receives an end user choice to store content of binary file 100 as inserted content 104, the system can load the content of binary file 100 from the client computer to one or more server computers for storage. The system can determine whether to store the content of binary file 100 using embedded container 106 or using remote container 108. The determination can be based on a setting of the container data field that is configured by a solution developer.

If the system determines that the content of binary file 100 is to be stored using embedded container 106, the system can store the content of binary file 100 in a shared database file that also stores values of other data fields. If the system determines that the content of binary file 100 is to be stored using remote container 108, the system can store the content of binary file 100 in one or more database files, separately from other database files. Each database file can be given a unique name, and can be encrypted. Remote container 108, or a data structure configured to store metadata of the content and the remote database file, can be created. The metadata can include information, including access restriction information, of the content and the remote database file. In some implementations, the system can convert an embedded container to a remote container by splitting a database file, or convert a remote container to an embedded container by merging database files.

One advantage of storing the content of binary file 100 in a remote container over storing local reference 102 can be security. When the content of binary file 100 is stored in an external file on a file system of a client computer, (1) a user having access to the file system of the client computer can access the content of binary file 100; and (2) a user not having access to the file system of the client computer cannot access the content of binary file 100. The access restrictions to a file system of the client computer, which can be specified by an end user of the client computer, may not be the same as the access restrictions of the container data field, which can be specified in the relational database by the solution developer. In comparison, when the content of binary file 100 is stored using remote container 108, access to the content of binary file 100 can be determined in the relational database. The content can be encrypted. Encryption and decryption keys can be stored in a remote container. Thus, the content can be made as secure as the container data field according to the access restrictions of the container data field as specified by the solution developer.

Figure 2:
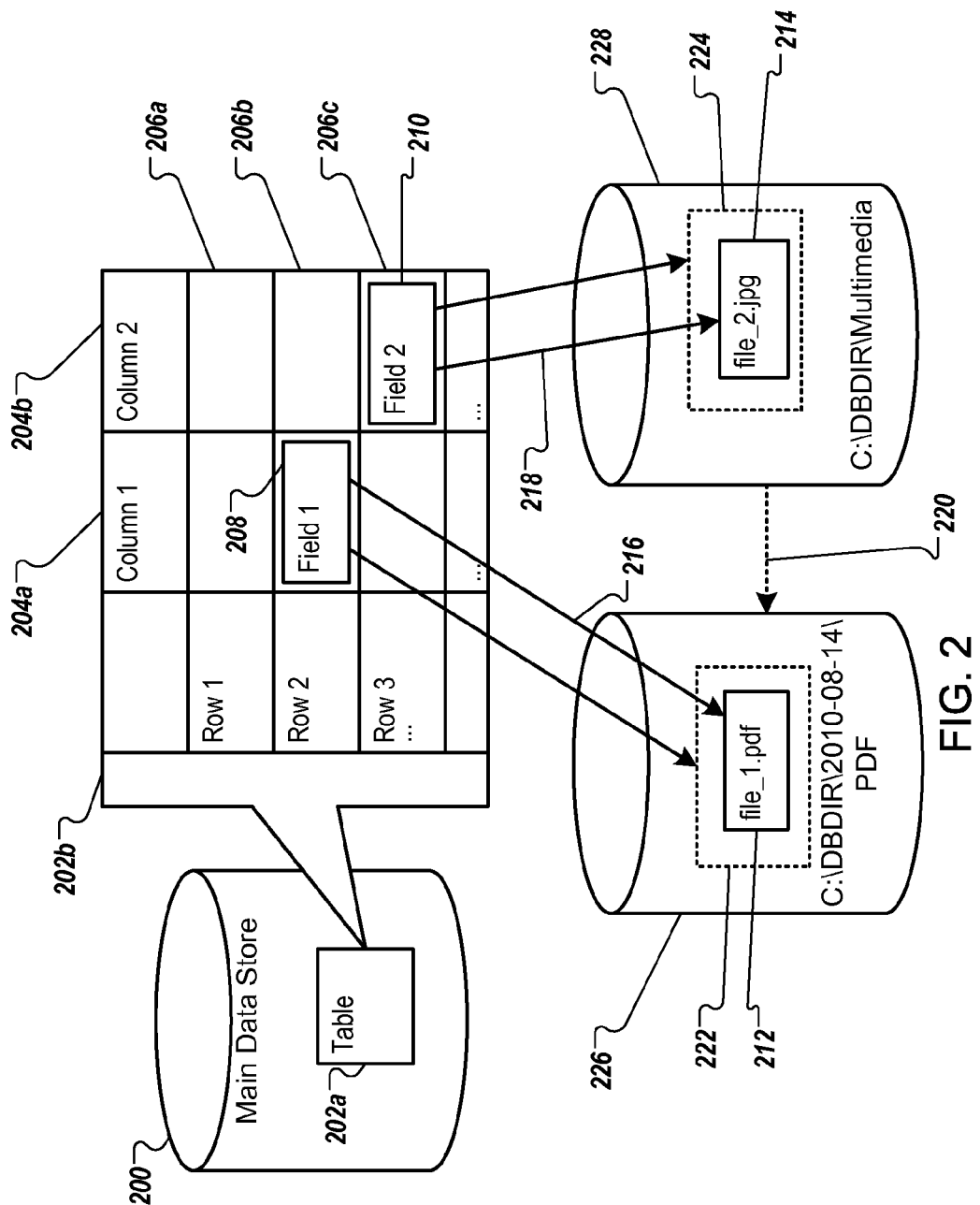
FIG. 2 illustrates exemplary remote container techniques.

FIG. 2 illustrates exemplary remote container techniques. For convenience, the techniques will be described in reference to a system that implements the remote container techniques in a relational database.

Data of the relational database can be stored in main data store 200. Main data store 200 can include one or more database files for storing the data. In some implementations, main data store 200 can include a single database file that contains all data of the relational database.

The relational database can include one or more tables, one of which is table 202a. Table 202b illustrates an enlarged view of table 202a of the relational database as stored in main data store 200. Table 202b can include one or more columns, e.g., column 204a and 204b. Each of column 204a and 204b can have a container data type. Table 202b can include one or more rows, e.g., rows 206a, 206b, and 206c. Each of the rows can include one or more data fields corresponding to the columns. For example, row 206b can include container data field 208; row 206c can include container data field 210.

Actual content of container data fields 208 and 210 can be stored in database files 212 and 214, respectively. The system can assign a name to each of database files 212 and 214. A name of each of the database files 212 and 214 can be configured to be unique in the relational database.

Database files 212 and 214 can be located remotely from main data store 200 as well as remotely from a client computer of the system. The system can store one or more database files 212 and 214 in the same directory or file system where main data store 200 is stored, including a subdirectory of the directory where main data store 200 is stored. Additionally or alternatively, the system can store one or more database files 212 and 214 in a directory or a file system that is different from the directory or file system where main data store 200 is stored. A file system can include a system for organizing computer files for storage, manipulation, and retrieval by an operating system. A directory can include a virtual grouping within a file system in which one or more files or directories can be stored.

Container data fields 208 and 210 can each be related to database files 212 and 214, respectively. The relations (e.g., relations 216 and 218) can be implemented using remote containers associated with container data fields 208 and 210. A remote container can store a reference (e.g., a path) to database file 212 or 214. In some implementations, the path can include a base directory and a relative path. The base directory can be a highest-level directory of database files 212 and 214. The system can maintain multiple base directories. Each base directory can be located on a different storage device, or a mounted volume. The relative path can specify a subdirectory of the base directory.

For example, the system can store database file 212 using path "C:\DBDIR\2010-08-14\PDF\file_1.pdf" in which "C:\DBDIR" is a base directory, "\2010-08-14\PDF\" is a relative path, and "file_1.pdf" is a unique name. Database file 212 ("file_1.pdf") can be stored on first storage device 226. Likewise, the system can store database file 214, which can include multimedia content, using path "C:\DBDIR\Multimedia\file_2.jpg." Database file 214 can be stored on a second storage device 228. Storage device 228 can be a mounted volume (as indicated by dotted arrow 220) under base directory "C:\DBDIR\" using name "Multimedia." The base directory or base directories can provide a database administrator a central place (e.g., "C:\DBDIR\") to inspect the remote containers, restrictions for accessing the remote containers, and to remap the remote containers if needed. In some implementations, container data fields 208 and 210 can each store a reference to a remote container, which, in turn, can store a path to database file 212 or 214.

The remote containers can store information that can be used to manage access restrictions 222 and 224 of database files 212 and 214, respectively. The information can include one or more keys for encrypting and decrypting database files 212 and 214. For example, database file 212 can be encrypted such that reading content of database file 212 requires a key to decrypt database file 212. The key can be stored in the remote container associated with container data field 208. The system can limit users who can access content of database file 212 to those who can access container data field 208. The content can be rendered through the relational database or an application program using the relational database. Thus, a user's access privilege to database file 212 can be independent of the user's access privilege to storage device 226. For example, a user who does not have access privilege to storage device 226 can access content of database file 212 stored on storage device 226.

Exemplary Remote Container Database Library

Figure 3A:
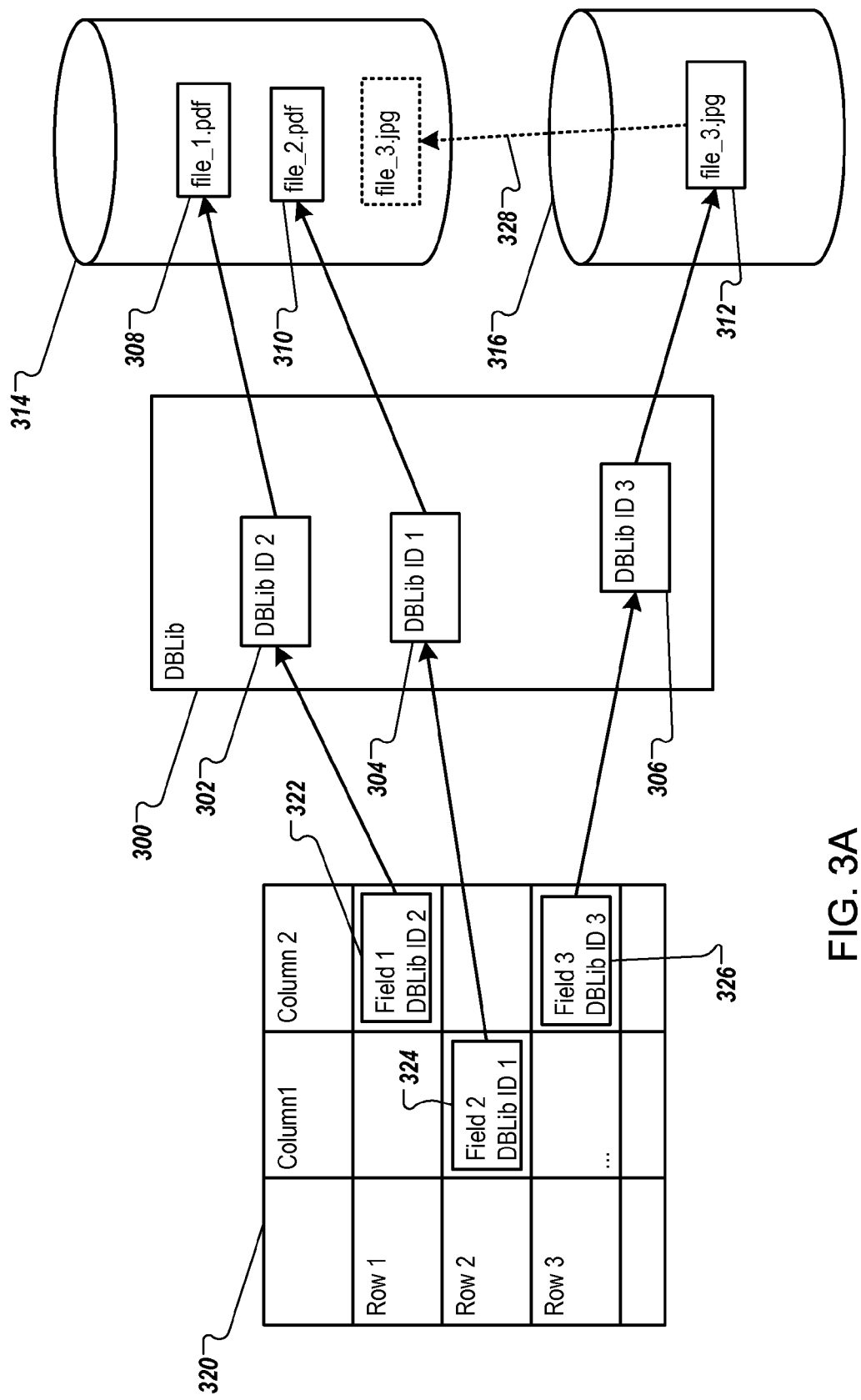
FIG. 3A illustrates exemplary implementations of remote container techniques using a database library.

FIG. 3A illustrates exemplary implementations of remote container techniques using a database library. For convenience, the exemplary implementations will be described in reference to a system that implements remote container techniques using the database library.

The database library can include container repository 300 and logics managing container repository 300. Container repository 300 can store one or more remote containers 302, 304, and 306. Each of remote containers 302, 304, and 306 can include a data structure corresponding to a respective container data field 322, 324, or 326. Each of remote containers 302, 304, and 306 can store metadata of a database file, e.g., database file 308, 310, or 212. The remote container information can include a reference to a respective database file 308, 310, or 312. The metadata of the database files can also include other information (e.g., access restrictions, content types, encryption methods) of the database files 308, 310, and 312. Database files 308, 310, and 312 can be stored on separate storage devices (e.g., storage devices) 314 and 316 shared with or remotely from container repository 300.

Container data fields 322, 324, and 326 corresponding to remote containers 302, 304, and 306 can be data fields of table 320 of a relational database. Container data fields 322, 324, and 326 each can store one or more references to remote containers 302, 304, and 306. A reference to a remote container can include an identifier of the remote container.

Storing in container data fields 322, 324, and 326 references to remote containers 302, 304, and 306 can have an advantage in data stability over storing containers 302, 304, and 306 directly in container data fields 322, 324, and 326. For example, when database file 312 moves (328) from storage device 316 to storage device 314, updating remote container 306 can propagate the move to all data fields in the relational database referencing remote container 306. Container data field 326 and other container data fields that contain references to remote container 306 (which can be cached on many client computers) can remain unchanged. Additionally, storing references to remote containers 302, 304, and 306 can provide support to transactional actions, which will be described in FIG. 3B in further detail.

Figure 3B:
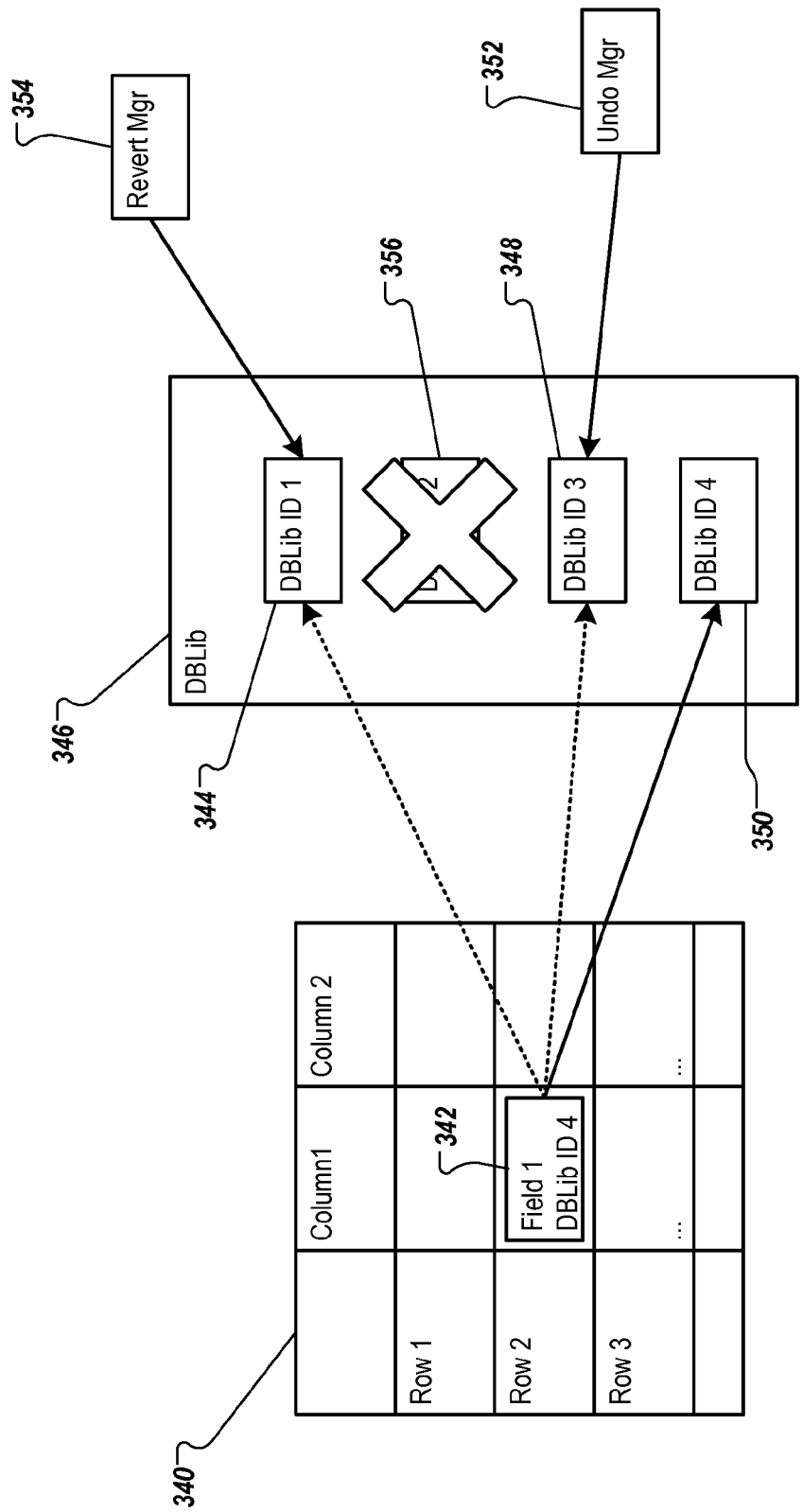
FIG. 3B illustrates exemplary implementations of transactional actions using remote containers.

FIG. 3B illustrates exemplary implementations of transactional actions using remote containers. The exemplary implementations will be described in reference to table 340 of a relational database in a system implementing remote container techniques.

Table 340 can include container data field 342. Container data field 342 can initially store a null reference. When the system receives data to be inserted into container data field 342, the system can create a new database file and a new remote container 344. The received data can be stored in the new database file. A reference to the database file can be stored in remote container 344. A reference to newly created remote container 344 can be stored in container data field 342. If the system receives updated data to be inserted into container data field 342 to replace current data in container data field 342, the system can provide functions to support transactional actions including undo, revert, and commit. The system can support the transactional actions by creating multiple remote containers to be maintained in database repository 346.

In some implementations, a database library can maintain in container repository 346 up to a specified number (e.g., three) of remote containers (e.g., remote container 344, 348, and 350) for a single container data field 342. Each time when updated data is received, the system can create a new remote container. For example, upon receiving first updated data, the system can create remote container 348. Then, upon receiving second updated data, the system can create remote container 350. The last created remote container (remote container 350) can be a current remote container of container data field 342. As a current remote container, remote container 350 can relate to content that is currently presented for display to a user performing the update.

Remote container 348 can be referenced by undo manager 352. Undo manager 352 can support an undo action by referencing a second-last created remote container, which, in this example, is remote container 348. When the system receives an undo input after creating remote container 350, undo manager 352 can set the current remote container to remote container 348. In various implementations, upon setting the current remote container to remote container 348, the system can clear the current remote container (e.g., remote container 350) that has been undone, or reference the current remote container using a redo manager.

An initial remote container (e.g., remote container 344), if committed, can be referenced by revert manager 354. Revert manager 354 can be responsible for data rollback when, for example, a user discards all current changes. In database transactions, multiple updates of container data field 342 can occur. Before the system receives a commit or equivalent input, revert manager 354 can roll back the current remote container to a last committed remote container (e.g., remote container 344) as if no update has occurred. After a roll back, a reference to original remote container 344 can be stored in container data field 342. Remote containers 348 and 350 can be cleared from container repository 346.

If the system receives a commit or equivalent input instead of an undo input or revert input, the update can be finalized. Upon finalization, revert manager 354 can reference a current remote container, which, in this example, is remote container 350. Other remote containers can be cleared (e.g., de-referenced, deleted, or marked as obsolete). The commit or equivalent input can conclude a current session of transaction. Further transactional activities can be part of a next session of transaction.

When a number of updates into container data field 342 exceeds the specified number in a single session of transaction, the oldest remote container in a current session after last commit can be cleared. For example, remote container 356 can be an oldest remote container created after data referenced in remote container 344 was committed. When the specified number is three (e.g., up to three remote containers are maintained for container data field 342), remote container 356 can be cleared when a fourth remote container (e.g., remote container 350) is created. The session can continue until an update is committed or when no more updates are received.

Figure 4:
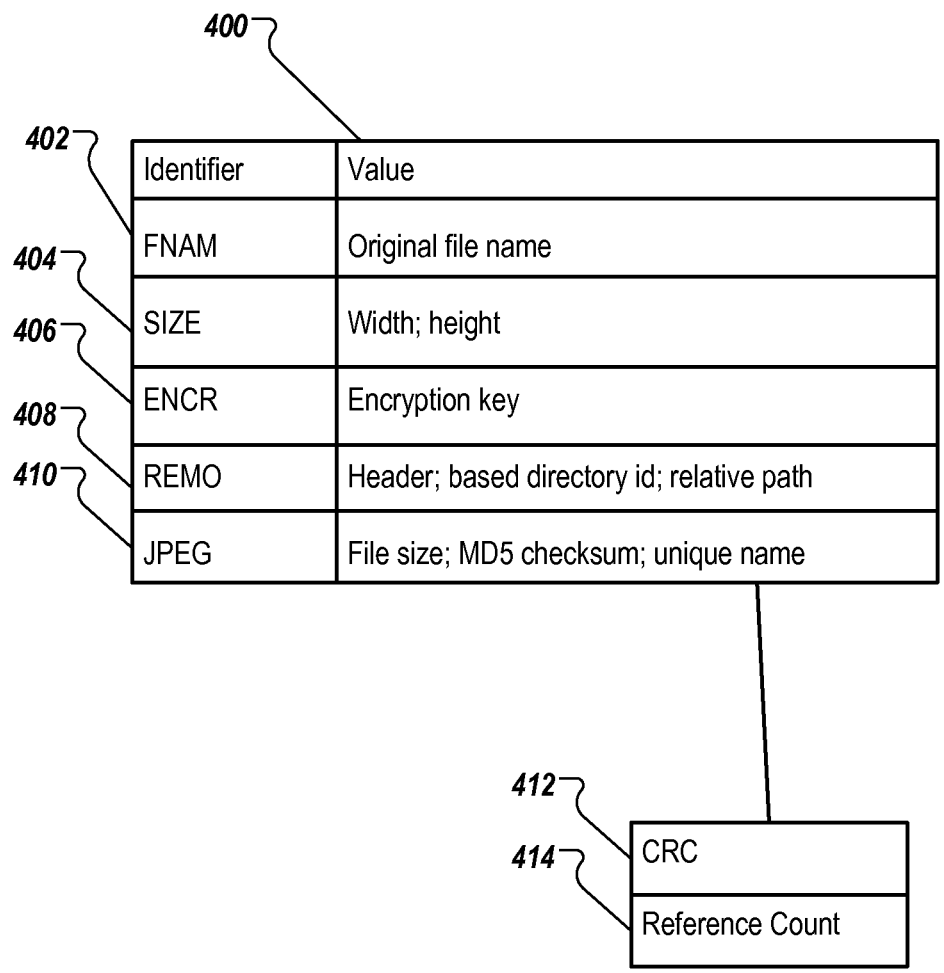
FIG. 4 illustrates an exemplary data structure of a remote container.

FIG. 4 illustrates an exemplary data structure of remote container 400. Remote container 400 can be associated with a container data field. Remote container 400 can include records 402, 404, 406, 408, and 410, not limited to that order, that contain information of content stored in a database file. Each record can include an identifier section and a value section. In some implementations, the identifier section can be a quad section. The quad section can include an identifier, or quad, that is four bytes long. The identifier can identify the record and the value. The value section, or stream section, can include specific information of the content stored in the database file.

Record 402 can be identified by quad "FNAM." The stream section of record 402 can include an original name (e.g., "original_file_name.jpg") of a file whose content is stored in the remote container. The original name can be presented to a user upon request when the content stored in the remote container is retrieved and presented to the user.

Record 404 can be identified by quad "SIZE." The stream section of record 404 can include a width and a height of the content, if the content includes an image. In some implementations, the width and height can be a width and a height of a default thumbnail of the image in number of pixels.

Record 406 can be identified by quad "ENCR." The stream section of record 406 can include an encryption key of the remote container. In some implementations, the encryption key can be made unique for each container data field for guaranteeing that content of the remote container can have the same access restriction as the container data field. In some implementations, the encryption key can be a 256-bit long randomly generated number.

Record 408 can be identified by quad "REMO." The stream section of record 408 can include multiple portions, including a four-byte header, followed by a base directory identifier, and a relative path. The header can include a flag indicating whether the remote container is encrypted, thus allowing the storage of an unencrypted remote container if needed. The header can include a particular version of hashing algorithm or a version of an encryption algorithm or both. For example, the hashing algorithm version can indicate whether a database file is encrypted using message-digest algorithm 5 (MD5) technology or secure hash algorithm 3 (SHA-3) technology. The encryption algorithm version can indicate whether a database file is encrypted using Triple Data Encryption Standard (3DES) cypher or Advanced Encryption Standard 256-bits (AES-256) cypher.

The base directory identifier and relative path in the stream section of record 408 can be parts of a path (e.g., a file system path) to a database file. A path to the database file can be a reference to the database file. A relational database containing a container data field can have one or more base directories specified, for example, by a solution developer. The base directories can be top-most directories in a directory hierarchy for storing remote containers. In some implementations, by default, a base directory can be a directory where other database files are stored (e.g., the same directory where main data store 200 of FIG. 2 is stored). The system can allow multiple user-configurable base directories. The base directories can be managed through a user interface provided to a solution developer. The base directories can be protected such that a base directory cannot be deleted through the user interface when the base directory is currently used by one or more container data fields. In various implementations, a base directory can point to a single, platform-specific location. The base directory can be an absolute path or a path relative to a location of the relational database. The base directory can point to a mounted drive.

The relative path in the stream section of record 408 can be specified for each container data field. The relative path can include a constant (e.g., literals) or a variable or both. If the relative path includes a variable, the variable can be resolved using one or more formulas and inputs. The inputs can include a time and date, a file size, a value of a data field, an identifier, a user name, etc. The relative path can be specified using a user interface that will be described in further detail below in reference to FIG. 6.

Record 410 can be identified by a quad indicating a data type of content in the database file. For example, a quad "JPEG" can indicate that the content includes a joint photographic experts group (JPEG) image; a quad "MPEG" can indicate that the content includes a moving picture experts group (MPEG) movie. The stream section of record 410 can include an eight-byte file size, a 16-byte MD5 checksum and a unique file name of the remote container. The unique file name can be created by the system based on an original name of a file from which the content is inserted into the remote container.

Remote container 400 can be associated with a unique identifier to distinguish remote container 400 from other remote containers. In some implementations, the identifier can include hash function value 412. Hash function value 412 can be calculated using a hash function that, in some implementations, can include an MD5 function or a cyclic redundancy check (CRC) function or both. Hash function value 412 can be used for equality comparison between remote containers. Hash function value 412 can be calculated when a container state is determined. The container state can be determined when remote container 400 is being saved in a database library. Hash function value 412 can be calculated by applying the hash function on at least one of the following: an individual value section, a base directory, a literal or resolved relative path, as well as information on whether the container of the container data field is an embedded container or remote container, openly stored or securely stored. When saving a new remote container to the database library, the system can first perform a lookup in the database library using the calculated hash function value to determine whether existing remote container 400 matches the new remote container. In some implementations, the lookup can include an index lookup. If remote container 400 is determined to match the new remote container, remote container 400 can be reused as the new remote container.

To facilitate reuse of remote container 400, the system can associate reference count 414 to remote container 400. Each time a matching new remote container is found, the system can increment reference count 414. Likewise, when a remote container is deleted, the system can decrement reference count 414 until reference count 414 reaches zero. A deletion operation of remote container 400 whose reference count is zero can cause remote container 400 to be actually cleared.

Exemplary Remote Container Directory Structure

Figure 5A:
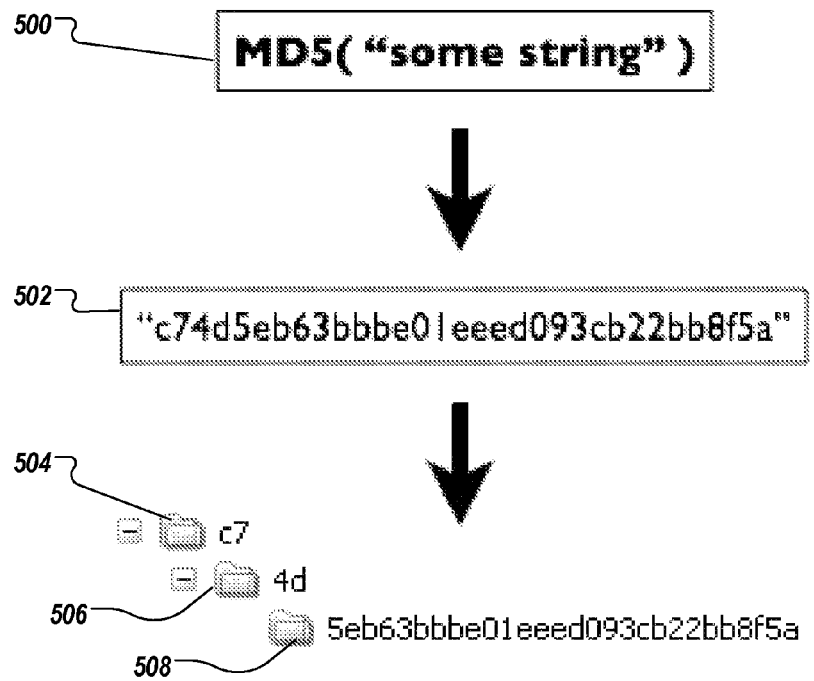
FIGS. 5A and 5B illustrate exemplary directory structures for storing a remote database file.
Figure 5B:
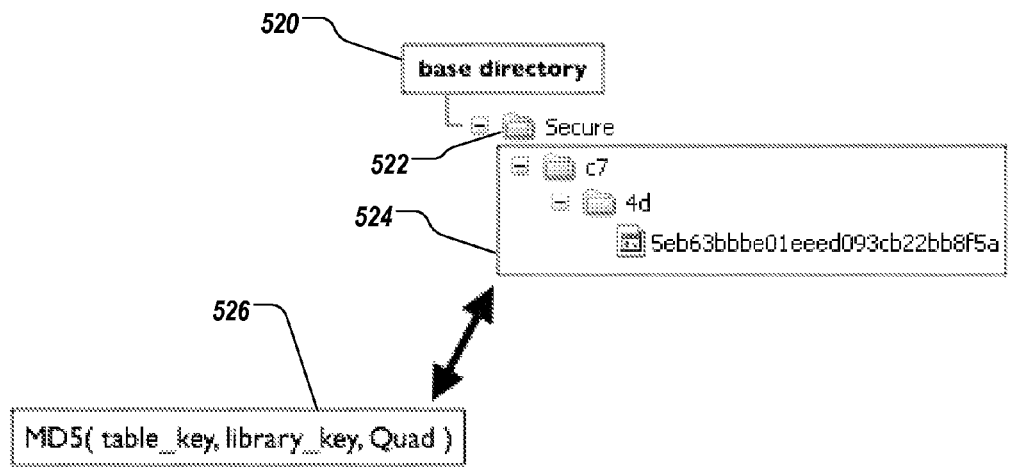

FIGS. 5A and 5B illustrate exemplary directory structures for storing a remote database file. FIG. 5A provides an overview of exemplary distribution of remote database files in a base directory of a system implementing the remote container techniques.

The system can assign a configurable base directory and a configurable relative directory to each container data field. A relational database table can include a variable number (sometimes an unlimited number) of rows. Accordingly, a large number of database files can exist. The database files can be stored on a file system. Storing a large number of files in a single directory or a limited number of directories of the file system, as specified by the base directory and relative directory, may negatively affect file system performance (e.g., file access speed), depending on characteristics of the file system as implemented on various platforms. To limit the number of database files stored in a single directory, the techniques of FIG. 5A can be used to distribute the multiple database files in multiple levels of subdirectories, thus limiting the number of database files in each subdirectory to an optimum number.

Distributing the database files can be accomplished using the following exemplary techniques. A hash function that includes a deterministic procedure that takes an arbitrary block of data and returns a fixed-size bit string (hash value) can be utilized. In some implementations, the system can apply (500) an MD5 hash function to content of the database file (e.g., "some string"). The MD5 hash function can generate hash value 502, which can include a string that contains 32 hexadecimal characters. Each character can have one of 16 possible values (e.g., from zero through f).

The system can create one or more first level subdirectories 504 in a directory specified by the base directory and relative path. Each first level subdirectory 504 can be named using a first portion of hash value 502. The first portion of the hash value 502 can include n first characters of hash value 502. The number n can be configured to maximize performance of a file system storing the database file. For example, performance including access speed of some file systems can be negatively affected when a quantity of items directly stored in a directory exceeds a certain threshold. The size of the first portion of hash value can determine how many first level subdirectories can be created. For example, when n=1, 2, or 3, the number of corresponding first level subdirectories having unique names can be 16, 256, or 4096. In some file systems, good performance can be achieved when the first portion of hash value 502 contains two characters (e.g., the first two characters "c7" of hash value 502), allowing 256 first level directories 504 to be created.

In some implementations, the system can create more levels of subdirectories. For example, the system can create one or more second level subdirectories 506 under each first level subdirectory 504, and name the second level subdirectories 506 using a second portion of hash value 502. The size of the second portion of hash value 502 can be determined based on performance characteristics of the file system storing the database file. The second portion of hash value 502 can include two characters (e.g., the third and fourth characters "4d" of hash value 502). Third level of subdirectory 508 can be named using the remaining portion of hash value 502 (e.g., characters number five through 32 of hash value 502). Likewise, up to 16 levels of subdirectories can be created using hash value 502, which can be 32 characters long. The database file can be stored in the deepest level of subdirectory (e.g., subdirectory 508).

FIG. 5B illustrates exemplary distribution of database files in a secure environment of a system implementing the remote container techniques. Database files can be distributed in one or more secured folders 522 under base directory 520. The system can create secured folders 522 under base directory 520 and name secured folders 522 using reserved, localized or non-localized names (e.g., "Secured"). The system can create distributed directory structure 524 using techniques described above in reference to FIG. 5A. In some implementations, in the secure environment, hash value 526 can be created based on a combination of one or more unique or characteristic values of the remote container. For example, hash value 526 can be created by a MD5 function from using as inputs a key (including a composite key) of a table ("table key"), an identifier of a remote container ("library key"), and one or more quad sections of the remote container ("Quad"). In a secured environment, a unique encryption key can be randomly generated for each individual database file stored in directory structure 524. The generated encryption key can be stored in the remote container.

Exemplary Remote Container User Interface

Figure 6:
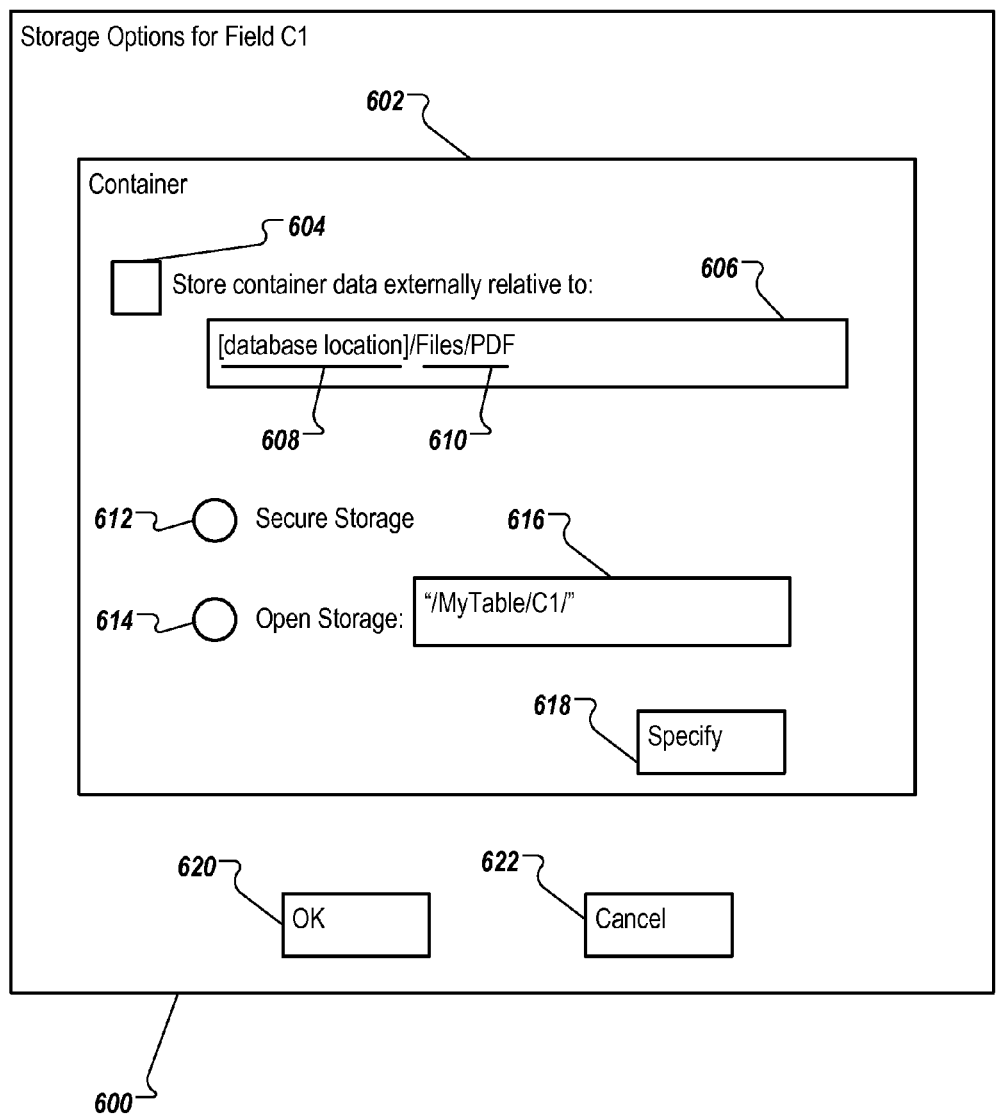
FIG. 6 illustrates an exemplary user interface for configuring a remote container.

FIG. 6 illustrates exemplary user interface 600 for configuring remote containers. User interface 600 can include multiple tabs that can be utilized to display different sets of controls in a single window of exemplary user interface 600. Storage tab 602 for configuring storage options of one or more remote containers is described for illustrative purposes.

Storage tab 602 can include checkbox 604, which, if checked, can allow content of a container data field to be stored in one or more database files. If checkbox 604 is unchecked, the system can store the content using embedded containers.

Base directory box 606 can receive input specifying a base directory for storing one or more database files for the container data field. The base directory can include an absolute path or a relative path. In some implementations, the base directory can include specifier 608 that specifies a default database directory where other database files are stored, and a subdirectory section 610 that specifies a subdirectory within the default directory specified by specifier 608. In some implementations, specifier 608 can have restricted editing access permissions (e.g., not accessible by an end user or a solution developer). Base directory box 606 can be implemented in various ways (e.g., as a text box or a drop down box).

Selections 612 and 614 can accept a selection that determines whether the database files are stored in a secured manner or open manner. If secure storage is selected, a "Secure" directory can be created under the base directory specified in based directory box 606. If open storage is selected, relative path box 616 can be utilized to accept input for specifying a relative path. The relative path can be appended to the base directory. The system can provide a default relative path that includes a table name (e.g., "MyTable") and a name of the container data field or container data column (e.g., "C1").

Control 618 (e.g., a button) can accept input to invoke a user interface for configuring the relative path using a calculation. A calculation can include a formula created using one or more functions, constants, operations, and information stored in one or more data fields. The calculation can be stored in a data field having a calculation data type (a calculation data field). The calculation can be resolved, or given a value, when all inputs to the formula in the calculation are definitive. The calculation configuring the relative path can be resolved at a time when data are inserted into the container data field. The resolved calculation can be stored in a remote container associated with the remote container data field. In some implementations, the calculation can include a primary key of the database table that contains the container data field (e.g., "'MyTable/' & PrimaryKeyOfMyTable").

Storage tab 602 can include controls 620 and 622 for saving and canceling inputs in the various controls described above in reference to FIG. 6.

Exemplary Processes of Maintaining Data States upon Forced Exit

Figure 7:
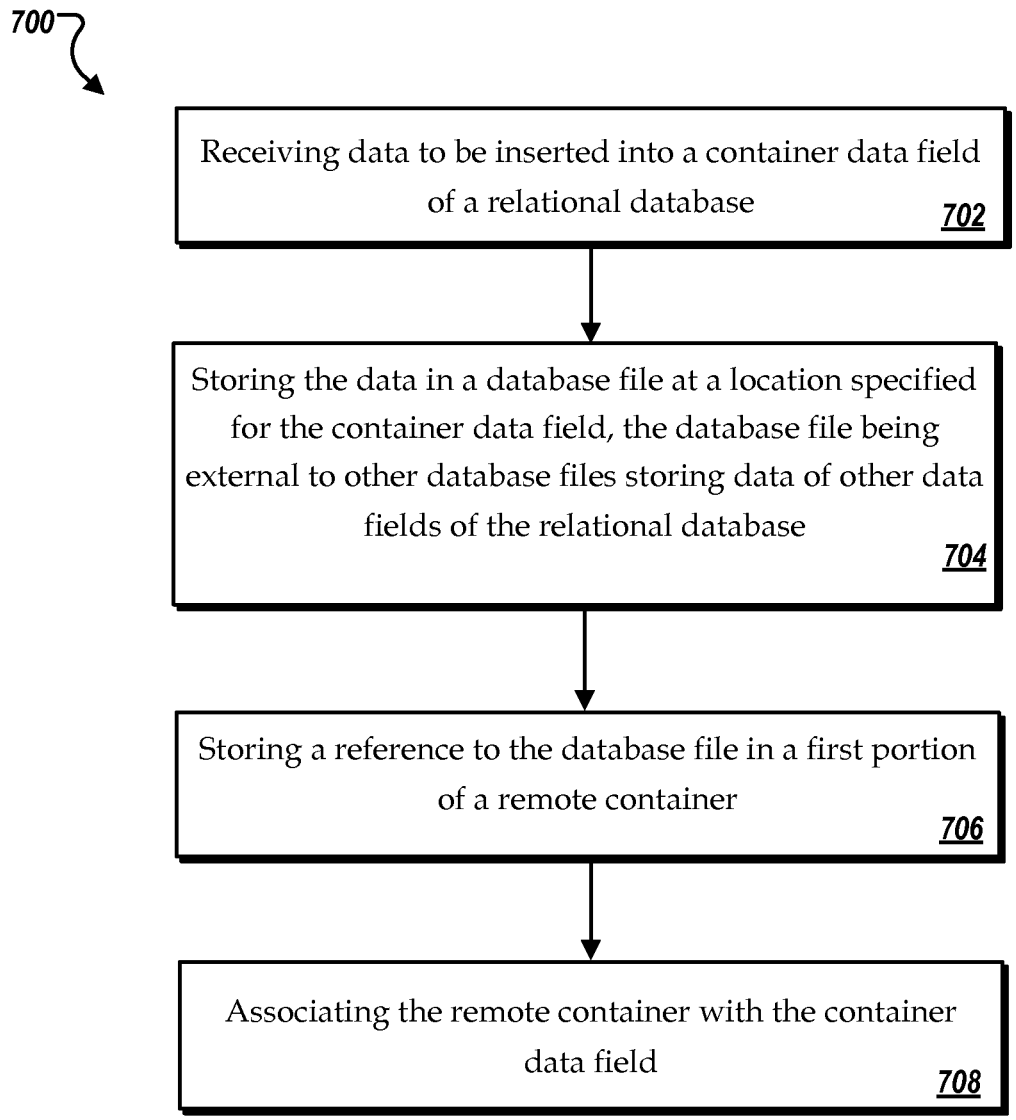
FIG. 7 is a flowchart illustrating an exemplary process of the remote container techniques.

FIG. 7 is flowchart illustrating exemplary process 700 of the remote container techniques. For convenience, process 700 will be described in reference to a system implementing exemplary process 700.

The system can receive (702) data to be inserted into a container data field of a relational database. The container data field can be a data field configured to store content of at least one of a data stream, a binary object, or a file.

The system can store (704) the received data in a remote database file at a location specified for the container data field. The remote database file can be external to other database files storing data of other data fields of the relational database. The system can determine an access restriction of the database file based on an access restriction of the container data field. Determining the access restriction of the database file can include encrypting the database file using an encryption key that is specific to the container data field, and storing the encryption key in a second portion of the remote container.

In some implementations, stage 704 of process 700 can include storing the remote database file in a directory, the directory including a relative path determined according to a calculation formula. Storing the received data in the remote database file can include resolving the calculation formula using inputs including at least one of a system variable or a value of another data field of the relational database, and storing the resolved formula in a portion of the remote container. In some implementations, storing the received data in the remote database file can include creating a file name of the database file that is unique at the location specified for the container data field.

The system can store (706) a reference to the remote database file in a first portion of a remote container. The remote container can be stored at a location specified for the container data field on a server computer. The remote container can include a data structure configured to store information, including access restrictions information, of the remote database file. In some implementations, storing the reference to the database file can store the unique remote database file name in the first portion of the remote container.

The system can associate (708) the remote container with the container data field. Associating the remote container with the container data field can include storing a reference to the remote container in the container data field. The reference can include a path to the remote data file. In some implementations, process 700 can further include storing an original file name of the data in the remote container. In some implementations, process 700 can further include storing the remote container in a container repository together with an embedded container. The system can store an identifier of the remote container as a value of the container data field.

FIGS. 8A-8F are flowcharts illustrating exemplary processes of the remote container techniques. For convenience, the exemplary processes will be described in reference to a system that implements the exemplary processes.

Figure 8A:
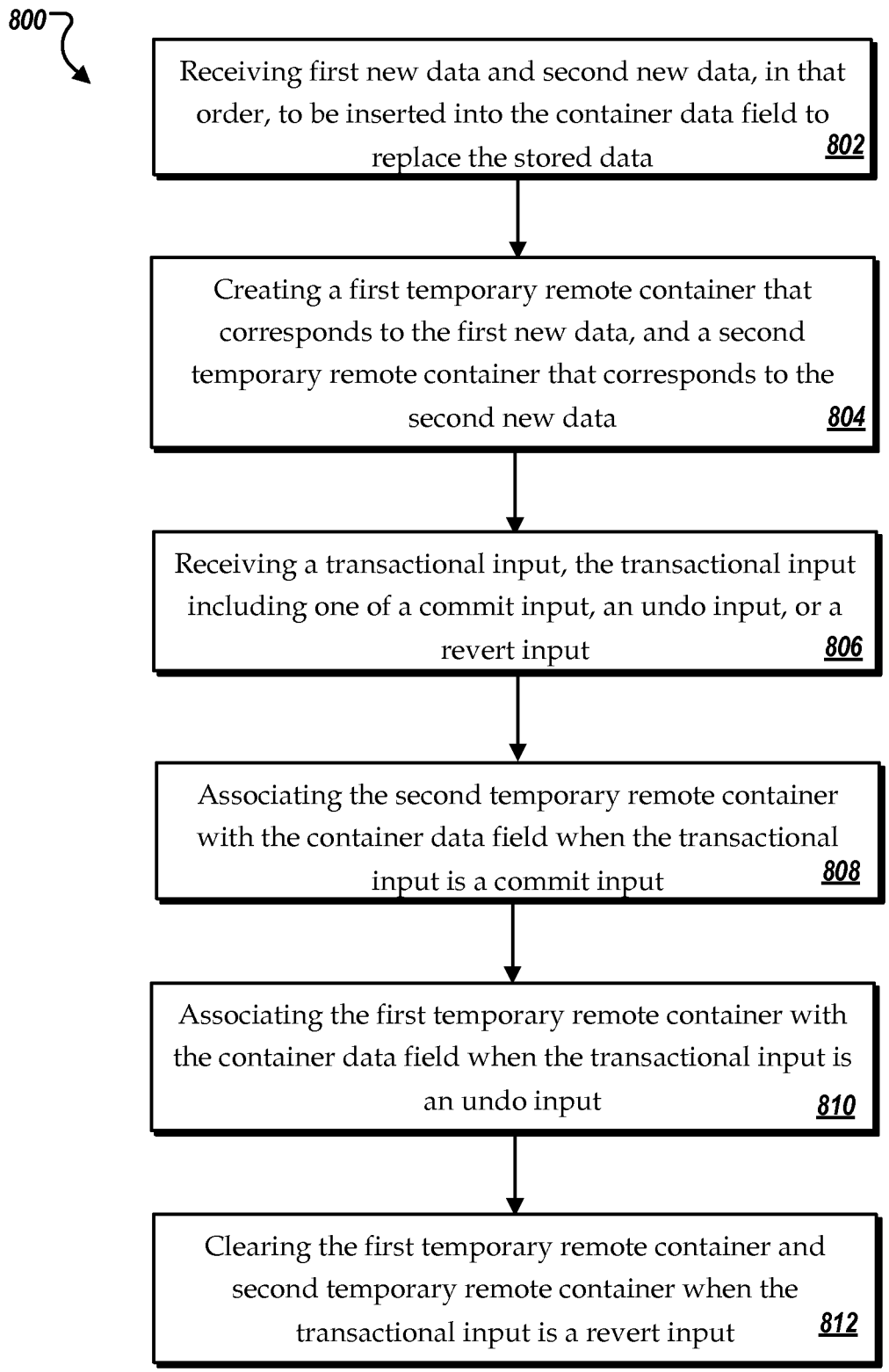
FIGS. 8A-8F are flowcharts illustrating exemplary processes of the remote container techniques.

FIG. 8A illustrates exemplary process 800 of updating a remote container. Updating a remote container can be an optional stage of exemplary process 700. The system can receive (802) first new data and second new data, in that order, to be inserted into the container data field to replace the stored data.

The system can create (804) a first temporary remote container that corresponds to the first new data, and a second temporary remote container that corresponds to the second new data.

The system can receive (806) a transactional input. The transactional input can include one of a commit input, an undo input, or a revert input. The commit input can include a request to finalize transaction of updating the container data field. The undo input can include a request to annul a last update. The revert input can include a request to annul all updates and retain the content of the container data field of a last commit.

The system can associate (808) the second temporary remote container with the container data field when the transactional input is a commit input. The system can associate (810) the first temporary remote container with the container data field when the transactional input is an undo input. The system can clear (812) the first temporary remote container and second temporary remote container when the transactional input is a revert input.

Figure 8B:
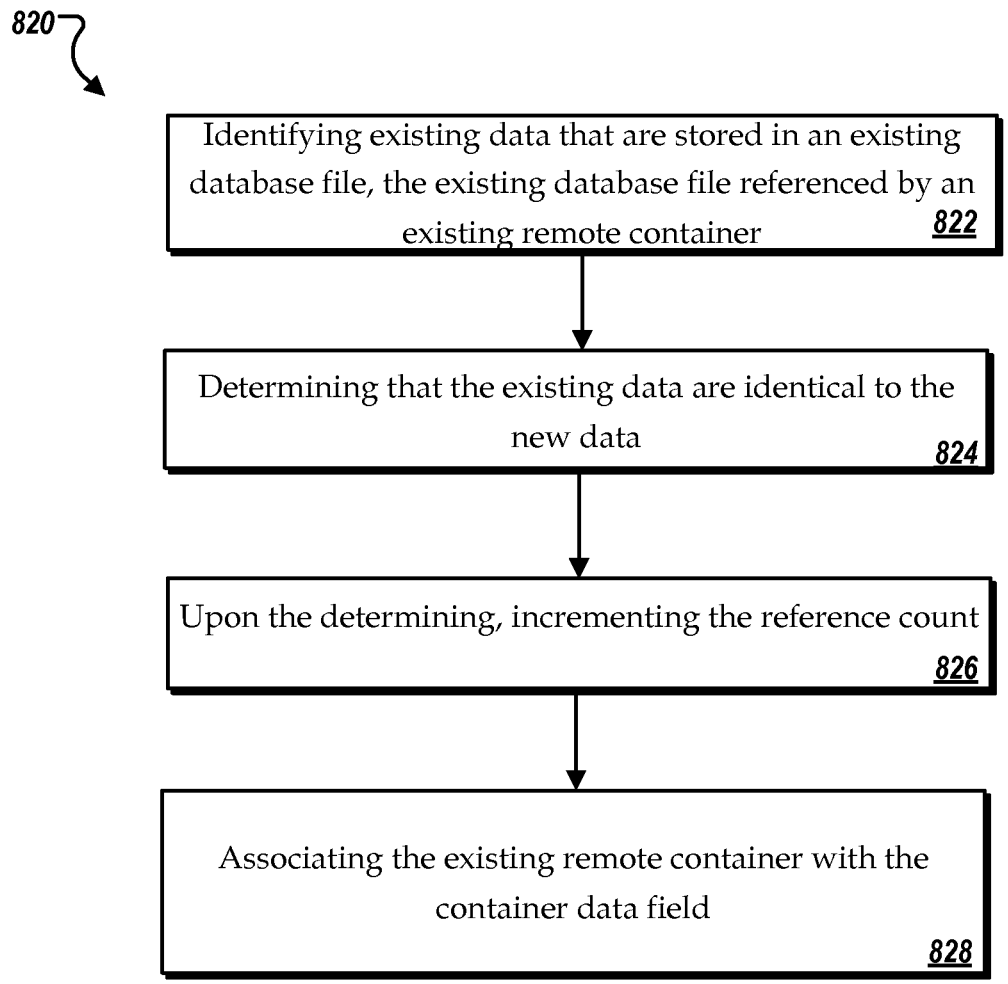

FIG. 8B is a flowchart illustrating exemplary process 820 of avoiding duplicate remote containers using reference count. When new data are to be inserted into a container data field, the system can identify (822) existing data that are stored in an existing database file. The existing remote database file can be referenced by an existing remote container. The existing remote container can be associated with a reference count. The reference count can be stored in association with existing remote container.

The system can determine (824) that the existing data are identical to the new data. Upon determining that the existing data are identical to the new data, the system can increment (826) the reference count. The system can associate (828) the existing remote container with the container data field such that a new remote container need not be created.

Figure 8C:
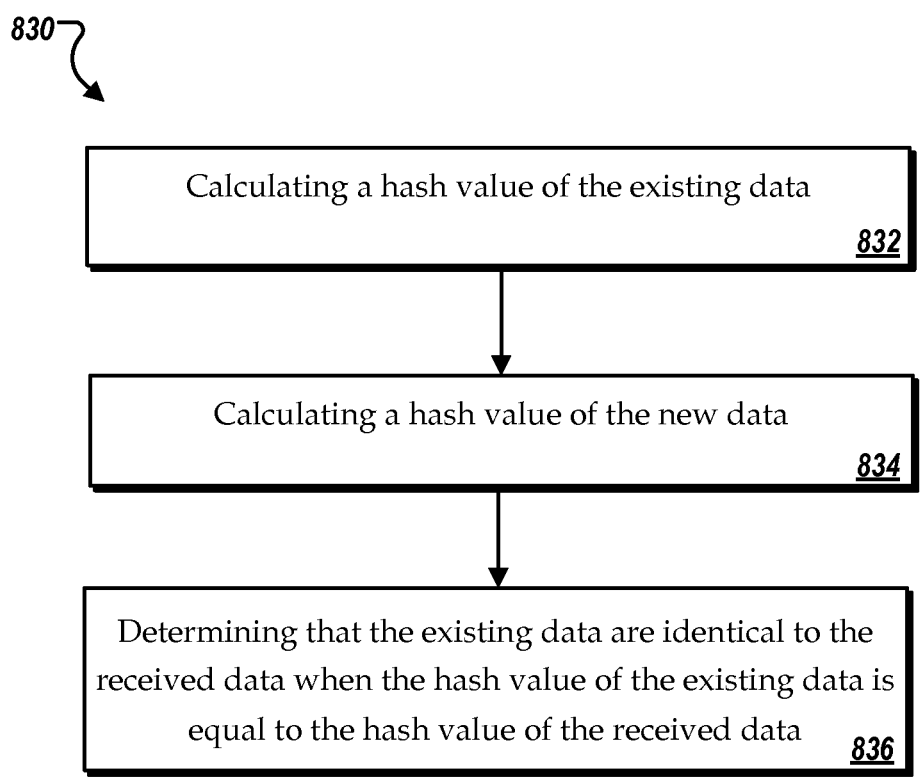

FIG. 8C is a flow chart illustrating exemplary process 830 of determining that the existing data stored in an existing remote data file are identical to the new data to be inserted into the container data field. In some implementations, exemplary process 830 can be optionally included in stage 824 as described above in reference to FIG. 8B. The system can calculate (832) a hash value of the existing data. Calculating the hash value of the existing data can include calculating a hash value using the existing data as input or using a combination of a table key, a library key, and a quad value as inputs. The table key can include a key that corresponds to and uniquely identifies a row in which the container data field is located. The library key can include an identifier of a data structure (e.g., a remote container) that corresponds to the container data field. The quad value can be a portion of the data structure.

The system can calculate (834) a hash value of the new data. The system can determine (836) that the existing data are identical to the new data when the hash value of the existing data is equal to the hash value of the new data.

Figure 8D:
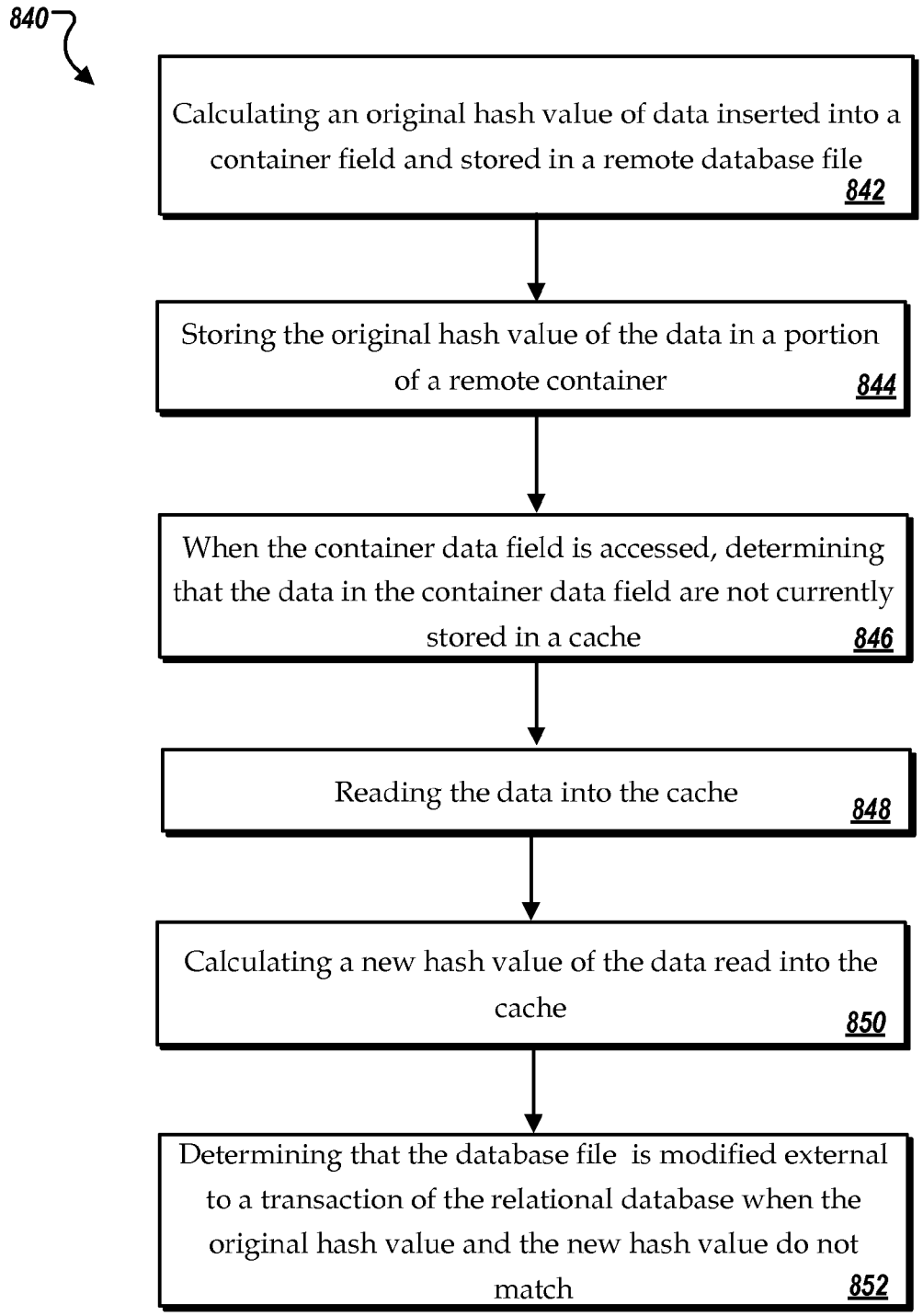

FIG. 8D is a flowchart illustrating exemplary process 840 of determining that a remote database file is modified external to a transaction of a relational database. Exemplary process 840 can be an optional stage of process 700 as described above in reference to FIG. 7.

The system can calculate (842) an original hash value of the data inserted into a container field. The system can store (844) the original hash value of the data in a portion of a remote container. When the container data field is accessed, the system can determine (846) that the data of the container data field are not currently stored in a cache. Upon the determination, the system can read (848) the data to be accessed into the cache. At the time when the data are read into the cache, the system can calculate (850) a new hash value of the second data read into the cache. The system can determine (852) that the remote database file is modified external to a transaction of the relational database when the original hash value and the new hash value do not match. Upon determining that the remote database file is modified external to a transaction of the relational database, the system can provide a warning in a user interface.

Figure 8E:
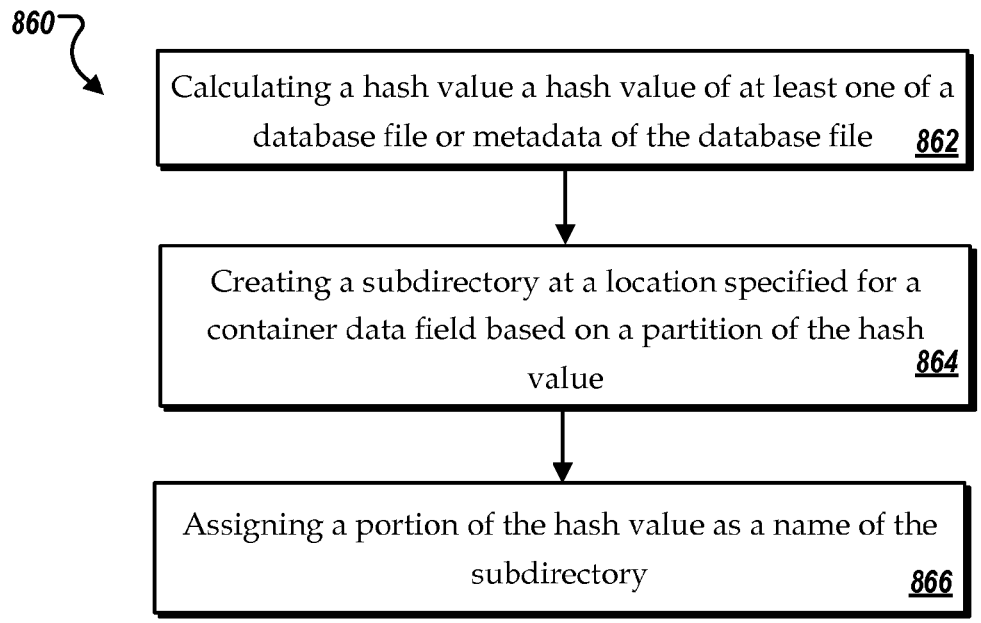

FIG. 8E is a flowchart illustrating exemplary process 860 of creating a subdirectory at the location specified for the container data field according to a random distribution calculated base at least in part on the data. Exemplary process 860 can be an optional stage included in stage 704 as described above in reference to FIG. 7. The system can store the remote database file in the subdirectory.

The system can calculate (862) a hash value of the remote database file, metadata of the database file, or both. The system can calculate the hash value using an algorithm that can generate characters in the hash value that are randomly distributed (e.g., an MD5 algorithm).

The system can create (864) the subdirectory at the location specified for the container data field based on a partition of the hash value. The system can assign (866) a portion of the hash value as a name of the subdirectory.

Figure 8F:
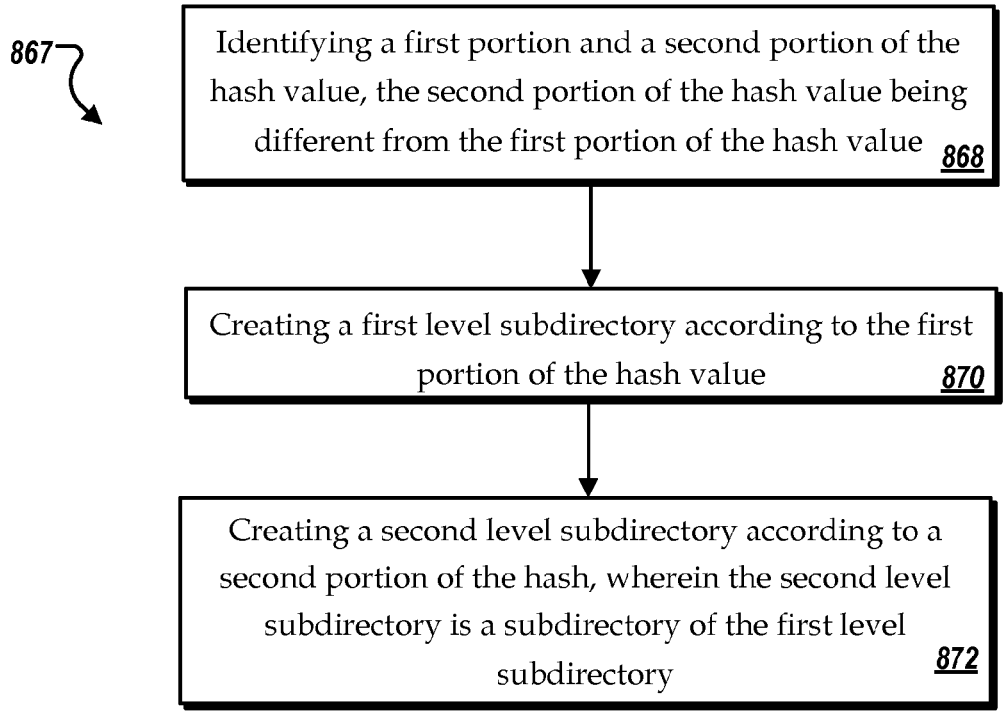

FIG. 8F is a flowchart illustrating exemplary process 867 of creating a subdirectory at the location specified for the container data field based on a partition of the hash value. In some implementations, exemplary process 867 can be optionally included in stage 864 as described above in reference to FIG. 8E. The system can identify (868) a first portion and a second portion of the hash value, the second portion of the hash being different from the first portion of the hash value. Each of the first portion and second portion of the hash value can include two hexadecimal characters.

The system can create (870) a first level subdirectory according to the first portion of the hash value. The system can create (872) a second level subdirectory according to a second portion of the hash value. The second level subdirectory can be a subdirectory of the first level subdirectory. The first level subdirectory can be a subdirectory of a base directory. The number of first level subdirectories and a number of second level subdirectories can be limited to 256 each, based on the two hexadecimal characters in each of the first portion and second portion of the hash value. The remote database files can be randomly distributed in a first level subdirectory and a second level directory.

Exemplary System Architecture

Figure 9:
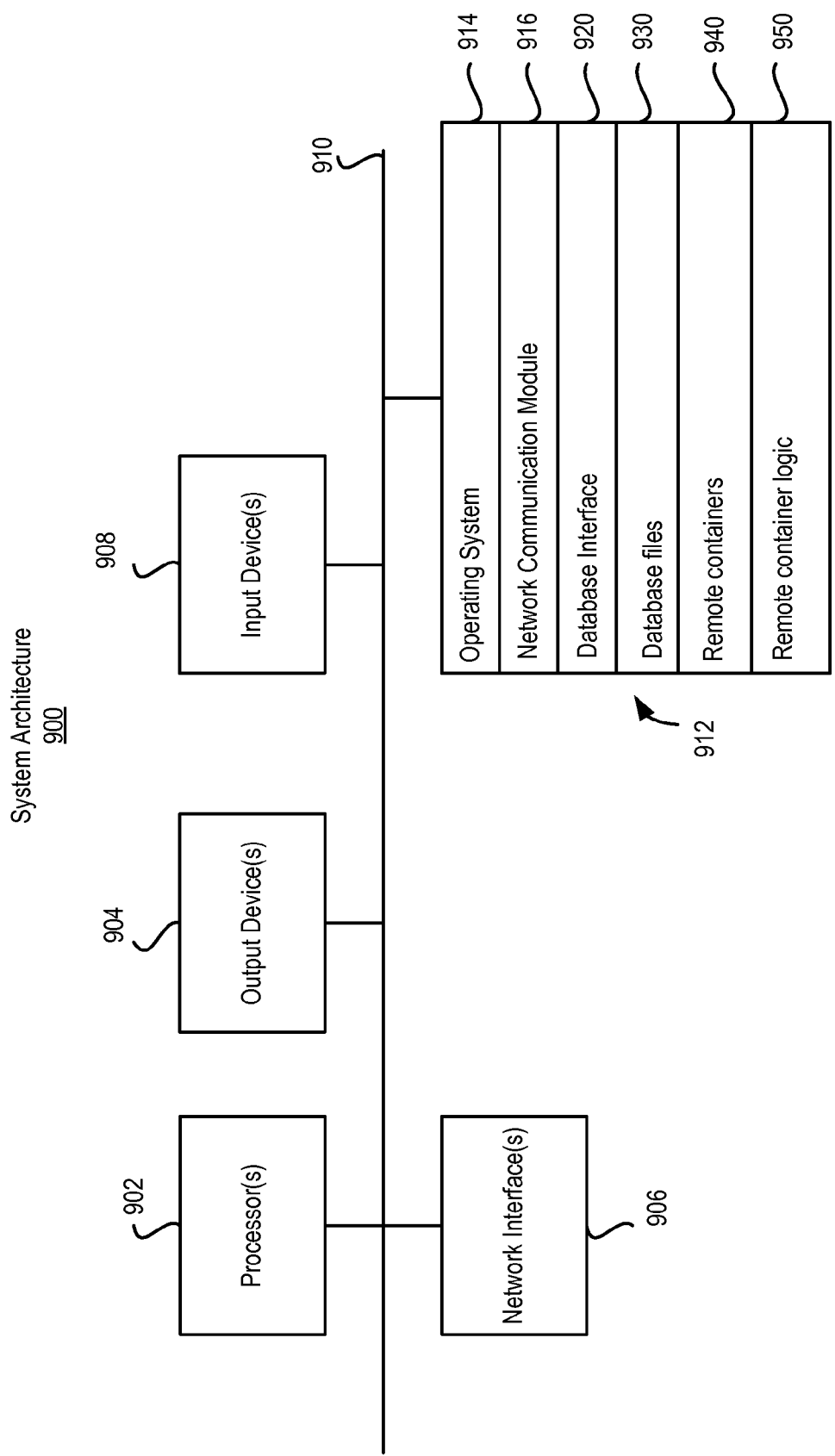
FIG. 9 is a block diagram of an exemplary system architecture for implementing the remote container features and operations.

FIG. 9 is a block diagram of an exemplary system architecture 900 for implementing the features and operations of remote container techniques. Other architectures are possible, including architectures with more or fewer components. In some implementations, architecture 900 includes one or more processors 902 (e.g., dual-core Intel® Xeon® Processors), one or more output devices 904 (e.g., LCD), one or more network interfaces 906, one or more input devices 908 (e.g., mouse, keyboard, touch-sensitive display) and one or more computer-readable mediums 912 (e.g., RAM, ROM, SDRAM, hard disk, optical disk, flash memory, etc.). These components can exchange communications and data over one or more communication channels 910 (e.g., buses), which can utilize various hardware and software for facilitating the transfer of data and control signals between components.

The term "computer-readable medium" refers to any medium that participates in providing instructions to processor 902 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 912 can further include operating system 914 (e.g., Mac OS® server, Windows® NT server), network communication module 916, database interface 920, database files 930, remote containers 940, and remote container logic 950. Database interface 920 can provide one or more user interfaces, interfaces between a server computer and a client computer, and interfaces between a relational database and other application program. Database file 930 can be utilized to store data in the relational database that are outside of remote containers (e.g., embedded content of a container data field). Remote containers 940 can store various content, as described above in FIGS. 1-8. Remote container logic 950 can include instructions that perform various functions (e.g., creating and partitioning hash values) used in implementing the remote container techniques.

Operating system 914 can be multi-user, multiprocessing, multitasking, multithreading, real time, etc. Operating system 914 performs basic tasks, including but not limited to: recognizing input from and providing output to devices 904 and 908; keeping track and managing files and directories on computer-readable mediums 912 (e.g., memory or a storage device); controlling peripheral devices; and managing traffic on the one or more communication channels 910. Network communications module 916 includes various components for establishing and maintaining network connections (e.g., software for implementing communication protocols, such as TCP/IP, HTTP, etc.). Database interface 920 can include interface to various databases including relational databases.

Architecture 900 can be included in any device capable of hosting a database application program. Architecture 900 can be implemented in a parallel processing or peer-to-peer infrastructure or on a single device with one or more processors. Software can include multiple software components or can be a single body of code.

The described features can be implemented advantageously in one or more computer program products that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer.

Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or plasma monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, Windows® like directory structure ("C:\DBDIR\") are used for illustration purposes. Other file system structure (e.g., a UNIX-like file system structure) is possible. Accordingly, other implementations are within the scope of the following claims.

What is claimed is:

1. A method comprising:
   receiving, by a computer, data to be inserted into a container data field of a relational database, the data including content being associated with a first access privilege;
   encrypting, by the computer, the data using an encryption key that is specific to the container data field;
   storing, by the computer, the encrypted data in a database file on a file system specified for the container data field, the database file being external to other database files storing data of other data fields of the relational database, the file system being associated with a second access privilege, wherein storing the encrypted data comprises:
   identifying existing data that are stored in an existing database file, the existing database file referenced by an existing remote container;
   determining that the existing data are identical to the received data; and
   upon the determining, incrementing a reference count of the existing remote container;
   storing, by the computer, a reference to the database file and the encryption key in a remote container; and
   associating, by the computer, the existing remote container with the container data field, wherein a user's access to content in the data is limited based on association of the existing remote container and the container data field.

2. The method of claim 1, wherein the content includes at least one of a data stream, a binary object, or a file.

3. The method of claim 1, wherein:
   the remote container includes a data structure configured to store information, including access restrictions information, of the database file; and
   associating the remote container with the container data field includes storing a reference to the remote container in the container data field.

4. The method of claim 1, wherein storing the encrypted data in the database file comprises:
   generating a hash of the content;
   creating a directory on the file system, the directory being named using a first portion of the hash;
   creating a subdirectory of the directory, the subdirectory being named using a second portion of the hash; and
   storing the encrypted data in the database file in the subdirectory.

5. The method of claim 4, wherein a size of each of the first portion and second portion of the hash is determined based on performance characteristics of the file system.

6. The method of claim 1, further comprising:
   receiving first new data and second new data, in that order, to be inserted into the container data field to replace the stored data;
   creating a first temporary remote container that corresponds to the first new data, and a second temporary remote container that corresponds to the second new data;
   receiving a transactional input, the transactional input including one of a commit input, an undo input, or a revert input;
   associating the second temporary remote container with the container data field when the transactional input is a commit input;
   associating the first temporary remote container with the container data field when the transactional input is an undo input; and
   clearing the first temporary remote container and second temporary remote container when the transactional input is a revert input.

7. The method of claim 1, wherein: when a user is permitted to access the file system according to the second access privilege, accessing, by the user, to content in the data is limited by the encryption key according to the first access privilege.

8. The method of claim 7, wherein determining that the existing data are identical to the received data includes:
   calculating a hash value of the existing data;
   calculating a hash value of the received data; and
   determining that the existing data are identical to the received data when the hash value of the existing data is equal to the hash value of the received data.

9. The method of claim 1, further comprising determining that the database file is modified external to a transaction of the relational database, including:
   calculating an original hash value of the data;

storing the original hash value of the data in a third portion of the remote container; and when the container data field is accessed:
  determining that the data are not currently stored in a cache;
  reading the data into the cache;
  calculating a new hash value of the data read into the cache; and
  determining that the database file is modified external to a transaction of the relational database when the original hash value and the new hash value do not match.

10. The method of claim 1, further comprising:
storing the remote container in a container repository together with an embedded container; and
storing an identifier of the remote container as a value of the container data field.

11. The method of claim 1, further comprising storing an original file name of the data in the remote container.

12. The method of claim 1, further comprising storing a location specified for the container data field in the remote container.

13. A system comprising:
one or more processors; and
a non-transitory storage device storing a computer program product, the computer program product being executed to cause the one or more processors to perform operations comprising:
  receiving data to be inserted into a container data field of a relational database, the data including content being associated with a first access privilege;
  encrypting the data using an encryption key that is specific to the container data field;
  storing the encrypted data in a database file on a file system specified for the container data field, the database file being external to other database files storing data of other data fields of the relational database, the file system being associated with a second access privilege;
  storing a reference to the database file and the encryption key in a remote container;
  associating the remote container with the container data field;
  storing the remote container in a container repository together with an embedded container; and
  storing an identifier of the remote container as a value of the container data field, wherein a user's access to content in the data is limited based on association of the remote container and the container data field.

14. The system of claim 13, wherein storing the encrypted data in the database file comprises:
generating a hash of the content;
creating a directory on the file system, the directory being named using a first portion of the hash;
creating a subdirectory of the directory, the subdirectory being named using a second portion of the hash; and
storing the encrypted data in the database file in the subdirectory.

15. The system of claim 13, wherein, when a user is permitted to access the file system according to the second access privilege, accessing, by the user, to content in the data is limited by the encryption key according to the first access privilege.

16. The system of claim 13, wherein storing the encrypted data in the database file comprises:
generating a hash of the content;
creating a directory on the file system, the directory being named using a first portion of the hash;
creating a subdirectory of the directory, the subdirectory being named using a second portion of the hash; and
storing the encrypted data in the database file in the subdirectory.

17. The system of claim 13, the operations further comprising storing an original file name of the data in the remote container.

18. The system of claim 13, the operations further comprising storing a location specified for the container data field in the remote container.

19. The system of claim 13, wherein:
the remote container includes a data structure configured to store information, including access restrictions information, of the database file; and
associating the remote container with the container data field includes storing a reference to the remote container in the container data field.

20. A non-transitory storage device storing a computer program product stored on a storage device, the computer program product being executed operable to cause one or more processors that are in communication with the non-transitory storage device to perform operations comprising:
a. receiving data to be inserted into a container data field of a relational database, the data including content being associated with a first access privilege;
b. encrypting the data using an encryption key that is specific to the container data field;
c. storing the encrypted data in a database file on a file system specified for the container data field, the database file being external to other database files storing data of other data fields of the relational database, the file system being associated with a second access privilege, wherein storing the encrypted data comprises:
  i. creating a subdirectory on the file system specified for the container data field according to a random distribution calculated base at least in part on the data; and storing the database file in the subdirectory;
  ii. storing a reference to the database file and the encryption key in a remote container; and
  iii. associating the remote container with the container data field, wherein a user's access to content in the data is limited based on association of the existing remote container and the container data field.

21. The product non-transitory storage device of claim 20, wherein the container data field is configured to store multimedia content.

22. The non-transitory storage device product of claim 20, wherein:
A. the remote container includes a data structure configured to store metadata of the database file; and
B. associating the remote container with the container data field includes storing a reference to the remote container in the container data field.

23. The product non-transitory storage device of claim 20, wherein, when a user is permitted to access the file system according to the second access privilege, accessing, by the user, to content in the data is limited by the encryption key according to the first access privilege.

24. The non-transitory storage device product of claim 20, wherein creating the subdirectory on the file system according to the random distribution includes:
A. calculating a hash value of at least one of the database file or metadata of the database file;
B. creating the subdirectory on the file system specified for the container data field based on a partition of the hash value; and assigning a portion of the hash value as a name of the subdirectory.

25. The non-transitory storage device product of claim 24, wherein creating the subdirectory based on the partitioning of the hash value includes:
   A. identifying a first portion and a second portion of the hash value, the second portion of the hash value being different from the first portion of the hash value;
   B. creating a first level subdirectory according to the first portion of the hash value; and creating a second level subdirectory according to a second portion of the hash, wherein the second level subdirectory is a subdirectory of the first level subdirectory.

26. The non-transitory storage device product of claim 25, wherein each of the first portion and second portion of the hash value includes two hexadecimal characters limiting a number of first level subdirectories and a number of second level subdirectories to 256 each.

27. The non-transitory storage device product of claim 20, wherein storing the encrypted data in the database file includes storing the database file in a directory, the directory including a relative path determined according to a calculation formula.

28. The non-transitory storage device product of claim 20, wherein storing the encrypted data in the database file includes: resolving the calculation formula using inputs including at least one of a system variable or a value of another data field of the relational database; and storing the resolved formula in a fourth portion of the remote container.

29. The non-transitory storage device product of claim 20, wherein:
   A. storing the encrypted data in the database file includes creating a file name of the database file that is unique at a location on the file system specified for the container data field; and
   B. storing the reference to the database file includes storing the unique file name in the remote container.

* * * * *

UNITED STATES PATENT AND TRADEMARK OFFICE
CERTIFICATE OF CORRECTION

PATENT NO.       : 8,688,585 B2
APPLICATION NO.  : 12/856497
DATED            : April 1, 2014
INVENTOR(S)      : Oleg Zaydman, Clay Maeckel and Lyndley Crumly It is certified that error appears in the above-identified patent and that said Letters Patent is hereby corrected as shown below:

On the Title Page, Item 74 Primary Examiner, replace:
"Evans J Augustin" with
-- Evens J Augustin --

In the Claims

Column 18, Line 19 at Claim 20; replace:
"program product stored on a storage device, the computer" with
-- program product, the computer --

Column 18, Line 20 at Claim 20; replace:
"program product being executed operable to cause one or" with
-- program product being executed to cause one or --

Column 18, Line 23 at Claim 20; replace:
"a. receiving data to be inserted into a container data field of" with
-- receiving data to be inserted into a container data field of --

Column 18, Line 26 at Claim 20; replace:
"b. encrypting the data using an encryption key that is spe-" with
-- encrypting the data using an encryption key that is spe- --

Column 18, Line 28 at Claim 20; replace:
"c. storing the encrypted data in a database file on a file" with
-- storing the encrypted data in a database file on a file --

Column 18, Line 34 at Claim 20; replace:
"i. creating a subdirectory on the file system specified for" with
-- creating a subdirectory on the file system specified for --

Signed and Sealed this
Sixth Day of October, 2015

Michelle K. Lee
*Director of the United States Patent and Trademark Office*

Column 18, Line 38 at Claim 20; replace:
"ii. storing a reference to the database file and the encrypt-" with
-- storing a reference to the database file and the encrypt- --

Column 18, Line 40 at Claim 20; replace:
"iii. associating the remote container with the container" with
-- associating the remote container with the container --

Column 18, Line 44 at Claim 21; replace:
"21. The product non-transitory storage device of claim 20," with
-- 21. The non-transitory storage device of claim 20, --

Column 18, Line 47 at Claim 22; replace:
"22. The non-transitory storage device product of claim 20," with
-- 22. The non-transitory storage device of claim 20, --

Column 18, Line 49 at Claim 22; replace:
"A. the remote container includes a data structure config-" with
-- the remote container includes a data structure config- --

Column 18, Line 51 at Claim 22; replace:
"B. associating the remote container with the container data" with
-- associating the remote container with the container data --

Column 18, Line 54 at Claim 23; replace:
"23. The product non-transitory storage device of claim 20," with
-- 23. The non-transitory storage device of claim 20, --

Column 18, Line 59 at Claim 24; replace:
"24. The non-transitory storage device product of claim 20," with
-- 24. The non-transitory storage device of claim 23, --

Column 18, Line 62 at Claim 24; replace:
"A. calculating a hash value of at least one of the database" with
-- calculating a hash value of at least one of the database --

Column 18, Line 64 at Claim 24; replace:
"B. creating the subdirectory on the file system specified for" with
-- creating the subdirectory on the file system specified for --

Column 19, Line 1 at Claim 25; replace:
"25. The non-transitory storage device product of claim 24," with
-- 25. The non-transitory storage device of claim 24, --

CERTIFICATE OF CORRECTION (continued)
U.S. Pat. No. 8,688,585 B2

Column 19, Line 4 at Claim 25; replace:
"A. identifying a first portion and a second portion of the" with
-- identifying a first portion and a second portion of the --

Column 19, Line 7 at Claim 25; replace:
"B. creating a first level subdirectory according to the first" with
-- creating a first level subdirectory according to the first --

Column 19, Line 12 at Claim 26; replace:
"26. The non-transitory storage device product of claim 25," with
-- 26. The non-transitory storage device of claim 25, --

Column 19, Line 17 at Claim 27; replace:
"27. The non-transitory storage device product of claim 20," with
-- 27. The non-transitory storage device of claim 20, --

Column 20, Line 4 at Claim 28; replace:
"28. The non-transitory storage device product of claim 20," with
-- 28. The non-transitory storage device of claim 27, --

Column 20, Line 10 at Claim 29; replace:
"29. The non-transitory storage device product of claim 20," with
-- 29. The non-transitory storage device of claim 20, --

Column 20, Line 12 at Claim 29; replace:
"A. storing the encrypted data in the database file includes" with
-- storing the encrypted data in the database file includes --

Column 20, Line 16 at Claim 29; replace:
"B. storing the reference to the database file includes storing" with
-- storing the reference to the database file includes storing --